Feb. 11, 1958 E. V. BUNTING 2,822,737
POWER OPERATING SYSTEM FOR TRACTOR HITCH LINKAGE
Original Filed March 25, 1948 7 Sheets-Sheet 1

INVENTOR.
ERNEST V. BUNTING
BY Carlson, Pitzner,
Hubbard & Wolfe
ATTORNEYS

Feb. 11, 1958 — E. V. BUNTING — 2,822,737
POWER OPERATING SYSTEM FOR TRACTOR HITCH LINKAGE
Original Filed March 25, 1948 — 7 Sheets-Sheet 2
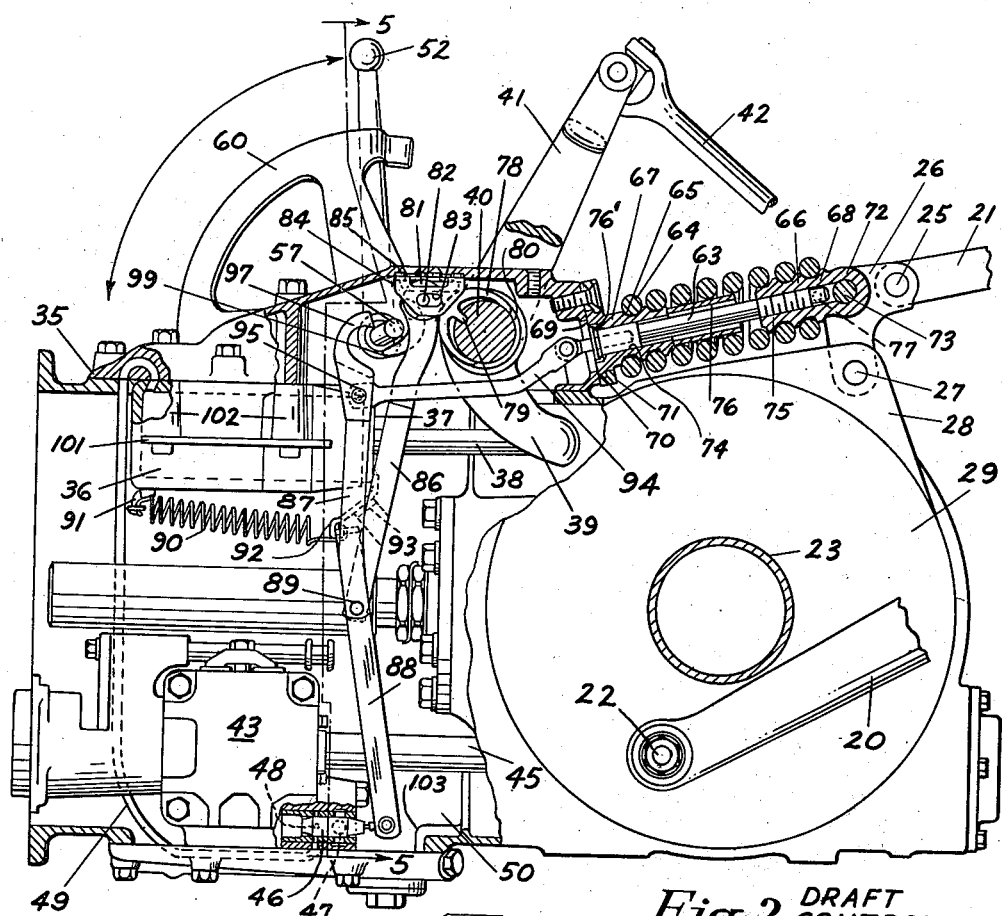
Fig. 2 DRAFT CONTROL OPERATION—TRANSPORT (HITCH UNLOADED)
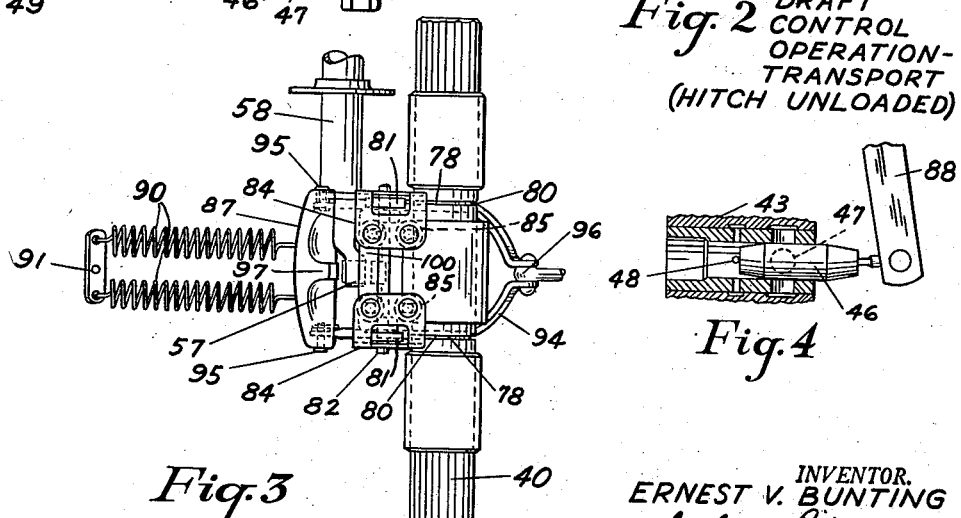
Fig. 3
Fig. 4
INVENTOR.
ERNEST V. BUNTING
BY Carlson, Pitzner, Hubbard & Wolfe
ATTORNEYS Feb. 11, 1958 E. V. BUNTING 2,822,737
POWER OPERATING SYSTEM FOR TRACTOR HITCH LINKAGE
Original Filed March 25, 1948 7 Sheets-Sheet 4
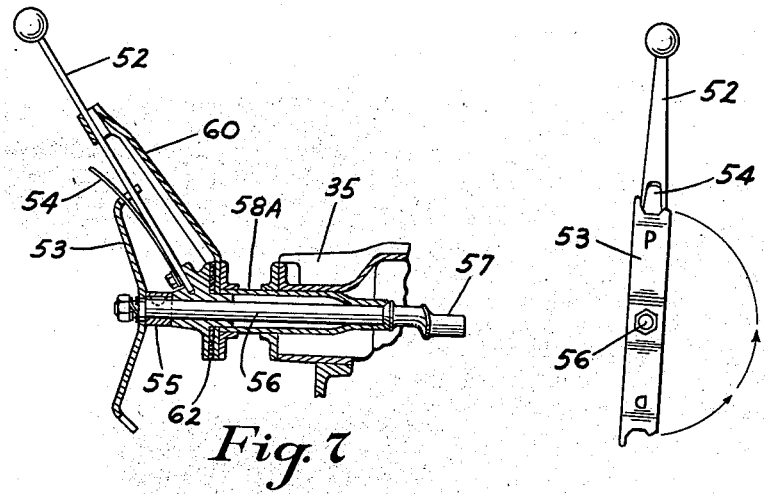
Fig. 7
Fig. 8
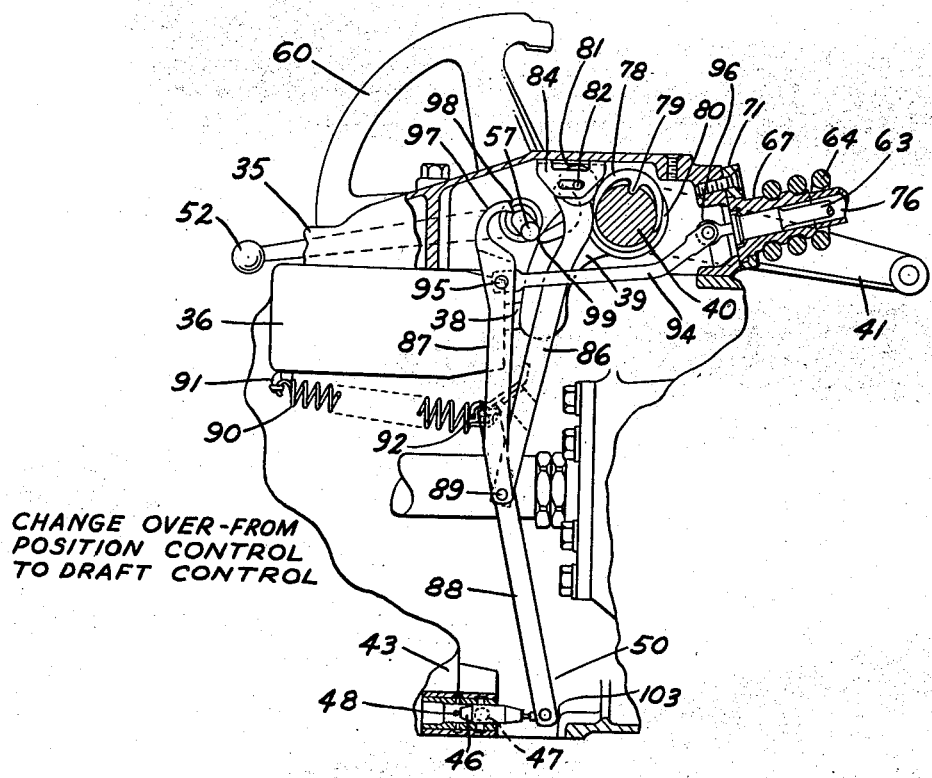
CHANGE OVER-FROM
POSITION CONTROL
TO DRAFT CONTROL
Fig. 6
INVENTOR.
ERNEST V. BUNTING
BY Carlson, Pitzner,
Hubbard & Wolfe
ATTORNEYS

POSITION CONTROL OPERATION—
LOWERING COMPLETED

INVENTOR.
ERNEST V. BUNTING
BY Carlson, Pitzner,
Hubbard & Wolfe
ATTORNEYS

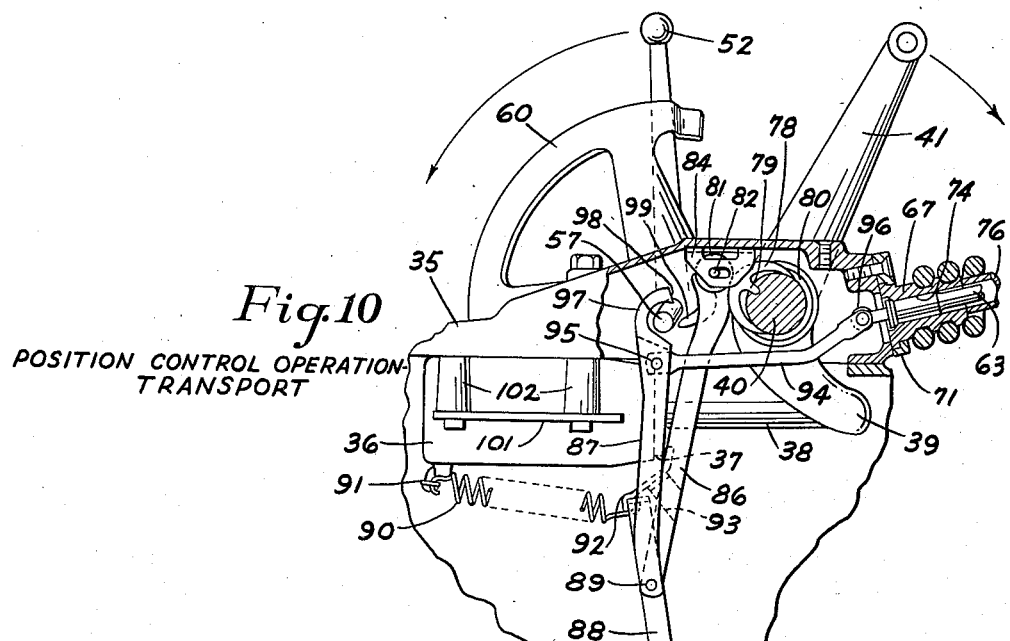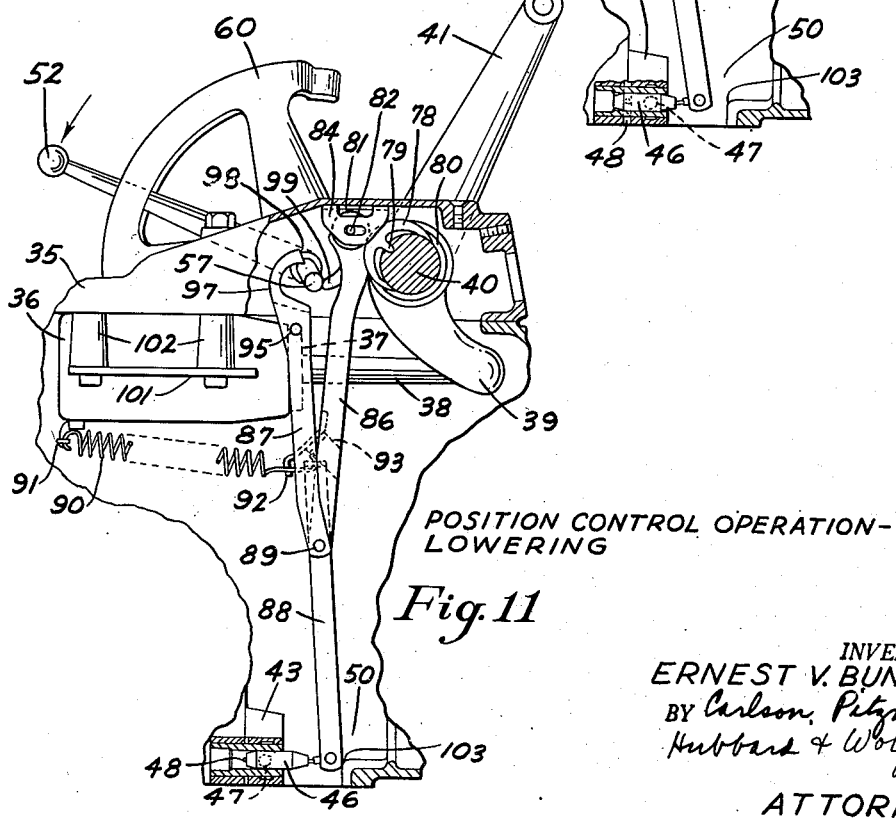

Feb. 11, 1958     E. V. BUNTING     2,822,737
POWER OPERATING SYSTEM FOR TRACTOR HITCH LINKAGE
Original Filed March 25, 1948     7 Sheets-Sheet 7

DRAFT CONTROL OPERATION— LOWERING

DRAFT CONTROL OPERATION— LOWERING COMPLETED

DRAFT CONTROL OPERATION— OVERLOAD RELEASE

INVENTOR.
ERNEST V. BUNTING
BY Carlson, Pitzner, Hubbard & Wolfe
ATTORNEYS

United States Patent Office 2,822,737
Patented Feb. 11, 1958

2,822,737

POWER OPERATING SYSTEM FOR TRACTOR HITCH LINKAGE

Ernest V. Bunting, Detroit, Mich., assignor, by mesne assignments, to Massey-Harris-Ferguson, Inc., a corporation of Maryland Continuation of application Serial No. 16,904, March 25, 1948. This application June 3, 1954, Serial No. 434,177

24 Claims. (Cl. 97—46.07)

The present invention pertains to a novel and improved power operating system for tractor hitch linkages. The basic type of system on which the present invention is an improvement is that disclosed in Henry George Ferguson Patent No. 2,118,180, issued May 24, 1938. This application is a continuation of my co-pending application Serial No. 16,904, filed March 25, 1948, now abandoned.

My general aim here has been to afford a system of novel and simplified form and structure which is calculated to enlarge the scope and utility of the basic system of that Ferguson patent and upon which the present system is patterned in so far as its broadest aspects are concerned. Such enlargement has been accomplished, firstly, by making it possible to switch over from the automatic "draft control" type of operation of the basic system to an automatic "position" type of control operation, and secondly, by greatly enlarging the range and type of implement loads usable with the system during the older automatic draft control style of operation.

In reference to converting to position control it may be noted that in my earlier application for patent, Serial No. 712,125, filed November 25, 1946, now Patent No. 2,632,628, issued March 24, 1953, I have disclosed the broad idea of conversion from automatic draft control to automatic position control in a system of the general character indicated. Also for purposes of orientation in the art, it is to be observed that in my earlier joint application with John M. Chambers, Serial No. 572,158, filed January 10, 1945, now Patent No. 2,437,875, issued March 16, 1948, we have disclosed a double-acting control spring arrangement for accomplishing the enlargement of range for draft control alluded to above. Such two aspects of improvement of the basic system of the Ferguson patent are claimed broadly in respective ones of my two earlier filed applications just identified. It is with improvements in their application and with simplification for commercial production and use that the present invention is primarily concerned.

More particularly, on the aspect of position control, the objectives of the present invention have included (1) simplification of the manipulations required of the operator, and of the mechanism used, in switching over from draft control to position control or vice versa, (2) simplification of the mechanical connections employed in interconnecting the manual control lever of the system for conjoint action alternatively with a position responsive device or a draft responsive device in actuation of the system's control valve mechanism, and (3) rendering the system completely free of draft response during position control operation except upon the application of an overload so severe as to require intervention of safety release measures.

Similarly, on the aspect of enlarging the range of response in draft control operation, the objectives of the present invention have included (1) simplification of control spring adjustment particularly upon initial installation and (2) provision for positive cutoff of the power system when the linkage is hoisted to transport position despite the variables introduced by the novel control spring arrangement employed.

Further objects and advantages of the invention will become apparent as the following description proceeds, taken in connection with the accompanying drawings, in which:

Fig. 2 is an enlarged fragmentary side elevation of the rear portion of the tractor, taken partially in longitudinal section, and showing the system conditioned for draft control with the hitch linkage raised to transport position and the linkage substantially unloaded.

Fig. 3 is a detail plan view of the centrally located lever mechanism included in the apparatus of Fig. 2 and also showing certain associated parts including the transverse rockshaft.

Fig. 4 is an enlarged longitudinal sectional view through the valve mechanism included in the apparatus shown in Fig. 2.

Fig. 6 is a view of the system somewhat similar to Fig. 2 but diagrammatic in character and showing the parts as they are located during transition from position control to draft control operation.

Fig. 7 is a longitudinal sectional view through an alternative or modified form of selector mechanism which may be substituted for that appearing in the upper left-hand portion of Fig. 5.

Fig. 8 is an end view of the quadrant lever and selector bar included in the mechanisms of both Figs. 5 and 7.

Figs. 10, 11 and 12 are diagrammatic views of the system, all showing it conditioned for position control operation, the location of the parts for transport being indicated in Fig. 10, the location during a lowering operation appearing in Fig. 11, and the location at the completion of the lowering operation appearing in Fig. 12.

Figure 13:
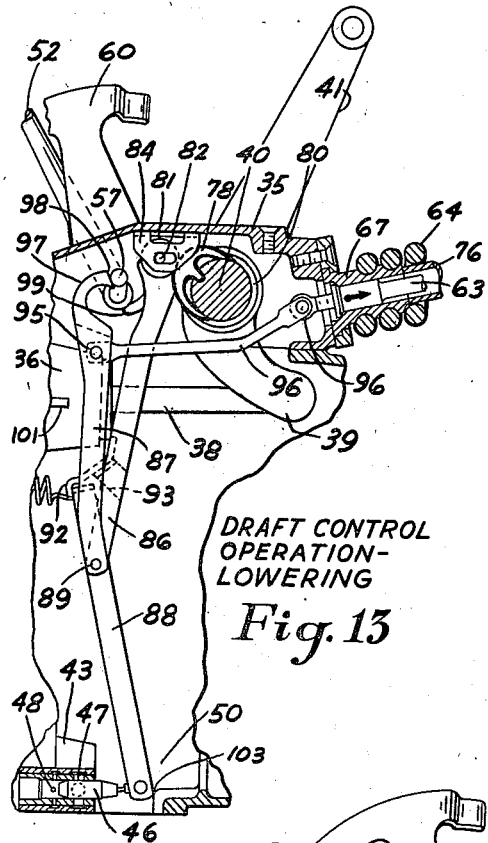
Figure 14:
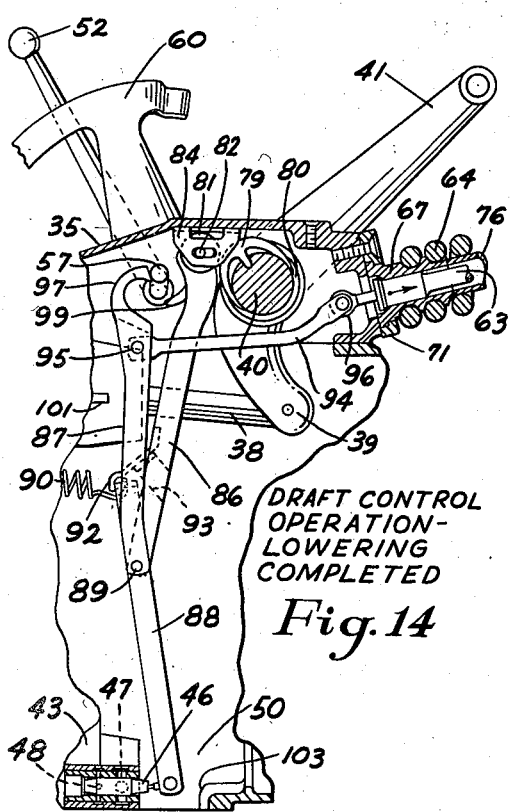
Figure 15:
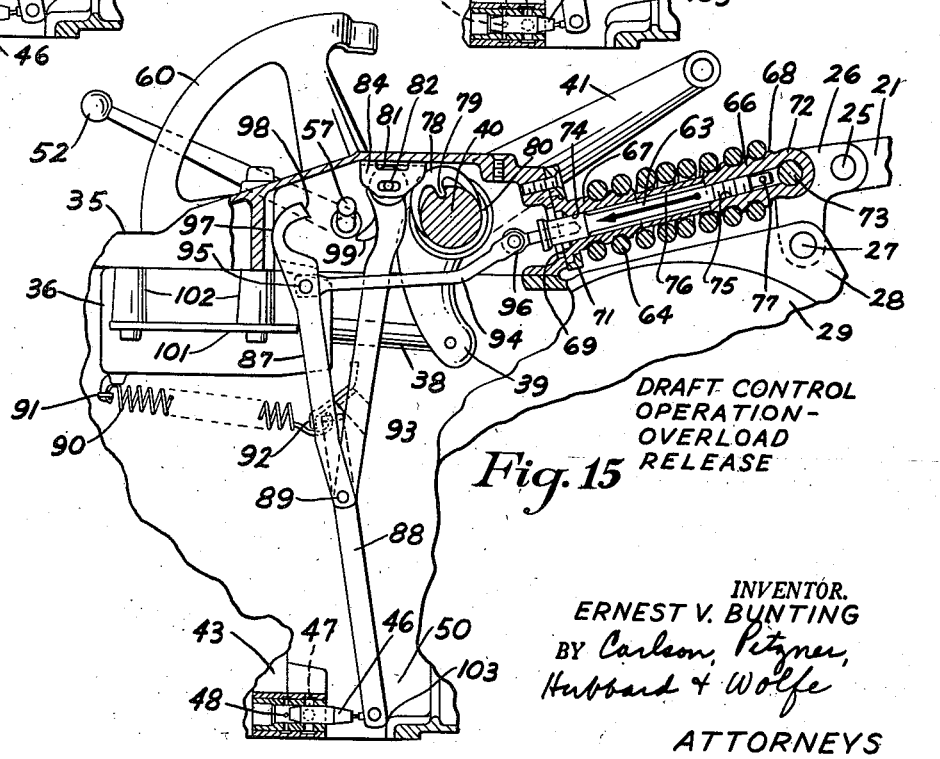

Figs. 13, 14 and 15 are also diagrammatic views of the system but in this instance showing it conditioned for automatic draft control operation, Fig. 13 showing the parts as located after manipulation of the manual control to lower the hitch linkage from transport with a heavy load on the draft linkage (contrast with light load in Fig. 2) but before lowering has started, Fig. 14 showing the parts located after follow-up to neutral during working in draft control, and Fig. 15 showing the location of the parts after release on overload.

A single preferred embodiment of the invention has been illustrated and described herein in some detail. There is no intention, however, that the detailed character of that disclosure should limit the invention to such particulars. On the contrary, such detail has been afforded simply to give greatest aid to the public in later constructing what now appears to me to be the most desirable form of my invention and it is my intention to cover all modifications and alternative arrangements falling within the spirit and scope of the invention as it is more broadly or generally characterized in the appended claims.

Tractor and hydraulic mechanism

Figure 1:
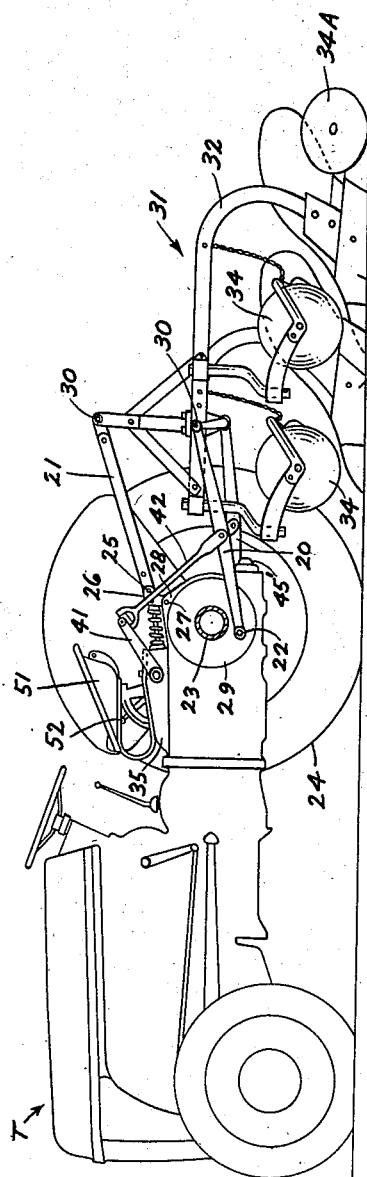
Figure 1 is a side elevation of a tractor equipped with a power operating system embodying the present invention, a typical implement being shown as attached to the hitch mechanism which is operated by the power system.
Figure 1A:
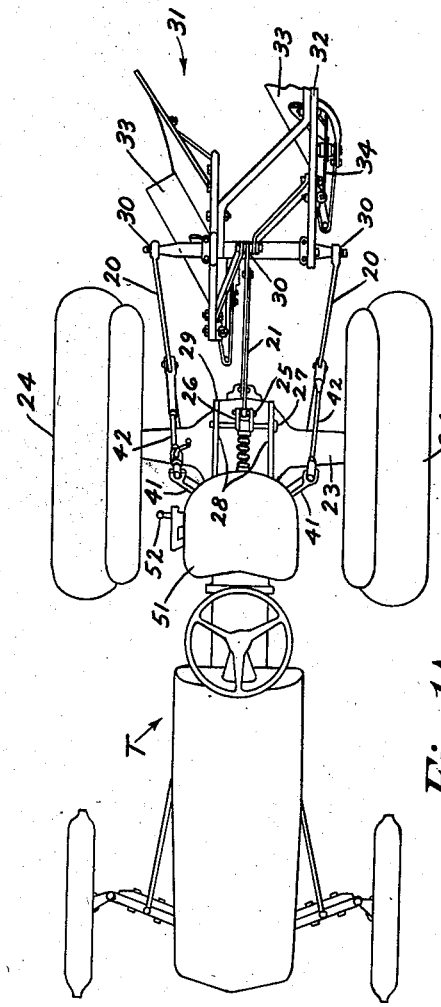
Fig. 1A is a partial plan view of the installation shown in Fig. 1.

Referring more particularly to the drawings, there is shown in Fig. 1 a lightweight four-wheel tractor T whose general external appearance will be familiar to those skilled in the art, the same being generally like that of Ferguson Patent No. 2,118,180 referred to above. At the rear end of this tractor is mounted the draft linkage of that Ferguson patent comprising in this instance a pair of lower or tension links 20 (see also Fig. 1A) and an upper or top link 21.

The lower draft links 20 are arranged side by side and converge forwardly. Their front ends are pivoted at 22 on the rear end portion of the tractor for vertical swing of such lower links about a transverse horizontal axis located below and slightly forward of the axis of the rear axle 23 on which the tractor's pneumatically tired rear traction wheels 24 are mounted. The pivots at 22 permit lateral swing of the draft links as well as vertical swinging motion. The top link 21 is detachably pivoted at its forward end about a removable pin 25 to the rearwardly projecting arms of a rocker or clevis 26 pivoted on a transverse pin 27 received in a pair of laterally spaced lugs 28 upstanding from the differential housing 29 at the rear end of the tractor (see also Fig. 2). Forward thrust on the top link 21 tends to swing the rocker 26 forward, while tension on the top link tends to pull the rocker rearward.

Swivelly mounted balls 30 are provided at the rear ends of each of the three draft links 20 and 21, being centrally apertured to receive removable connecting pins. By such means any desired ground working or other implement may be detachably connected to the draft linkage. In the present instance, and simply by way of example, the attached implement has been shown as a moldboard plow 31. Its general construction will be familiar to those skilled in the art. Suffice it to note that it has beams 32 beneath which are fixed two plow bases 33 with coulters 34 and the rolling disc or furrow wheel arrangement 34A of Henry George Ferguson U. S. Patent No. 2,195,515.

Raising of the lower draft links 20 is accomplished by means of a hydraulic power unit on the tractor. Such unit includes a one-way ram comprising a cylinder 36 (Fig. 2) bolted to the removable roof 35 of the portion of the tractor's differential or rear center housing 29. In this cylinder, which opens to the rear, is slidably received a piston 37 having a piston rod 38 which projects rearward. The ball-shaped outer end of this piston rod 38 is received in the socketed lower end of an arm 39 rigid with a transverse rockshaft 40 journaled in the upper rear portion of the tractor. Also rigidly splined to this rockshaft 40 is a pair of upwardly and rearwardly extending crank arms 41 connected to respective ones of the lower draft links 20 by drop links 42. Accordingly, when pressure fluid is admitted to the cylinder 36 the piston 37 is thrust rearwardly to rock the crank arms 41 upward and thereby raise the lower draft links 20. Similarly, upon exhaust of fluid from the cylinder, the piston 37 is permitted to retreat into the cylinder under the urging of the gravity load of the draft links, and any implement attached to them, so that the links swing downward in a lowering direction.

Pressure fluid, such as oil, is supplied to the ram or actuator from a positive displacement pump 43 (Fig. 2) powered from the tractor engine (not shown). This pump may, for example, be of substantially the form shown in the previously mentioned Ferguson Patent No. 2,118,180 and, consequently, need not be detailed here. A hand lever 44 (Fig. 5) moves a shifter fork 45 for engaging or disengaging the drive connections from the engine to the pump 43 and to a power take-off at 45' (Fig. 1) at the rear end of the tractor. See U. S. Patent 2,223,002 of Henry G. Ferguson for further detail.

Supply and exhaust of fluid to the ram for correspondingly raising and lowering the draft linkage is desirably accomplished by means of a valve mechanism associated with the linkage side of the pump so that the pump may be driven continuously without recirculating fluid during idle periods for the system. In this present instance such valve mechanism is shown (Figs. 2 and 4) as including a single sliding valve plunger 46 arranged to control a set of intake ports 47 for the pump 43 and a set of restricted bleed ports 48 communicating with a supply line 49 leading from the discharge of the pump to the ram cylinder 36.

In its neutral or "off" position (Fig. 2) the valve plunger 46 blocks both the intake ports 47 and bleed ports 48. Under such conditions any fluid in the ram cylinder 36 is locked therein and no additional fluid can reach the pump 43 for supply to the ram. Upon a forward (leftward as viewed in Fig. 2) shift of the valve plunger 46 to its "raising" position the pump intake ports 47 are uncovered, admitting fluid to the pump from a surrounding sump chamber 50. The fluid thus admitted to the pump is delivered to the ram cylinder 36. During such time the bleed ports 48 are retained blocked. Conversely, when the valve plunger 46 is shifted rearward to its "lowering" position (Fig. 4), the intake ports 47 are blocked but the bleed ports 48 are uncovered thereby permitting fluid to exhaust from the ram cylinder to the sump 50. The restriction of the ports 48 limits the rate at which fluid may escape and thus safely limits the rate of descent for the draft linkage and attached implement.

In summary, the valve mechanism may occupy any one of three positions, namely, a mid or "neutral" position in which both entry and exit of fluid from the system are blocked (Fig. 2), a "raising" position in which additional fluid is continuously pumped into the system for raising the draft links 20 and a "lowering" position (Fig. 4) in which fluid is exhausted from the system for lowering such draft links.

Manual controls

In convenient position alongside the driver's seat 51 is mounted a swingable hand lever or quadrant lever 52 (Fig. 1). This quadrant lever can be moved up or down merely with finger tip pressure. Provision is moreover made so that it can be used not only during draft control operation to adjust the value of automatically maintained draft load but also during position control to raise or lower the draft links to a position determined by the setting of the lever.

Figure 5:
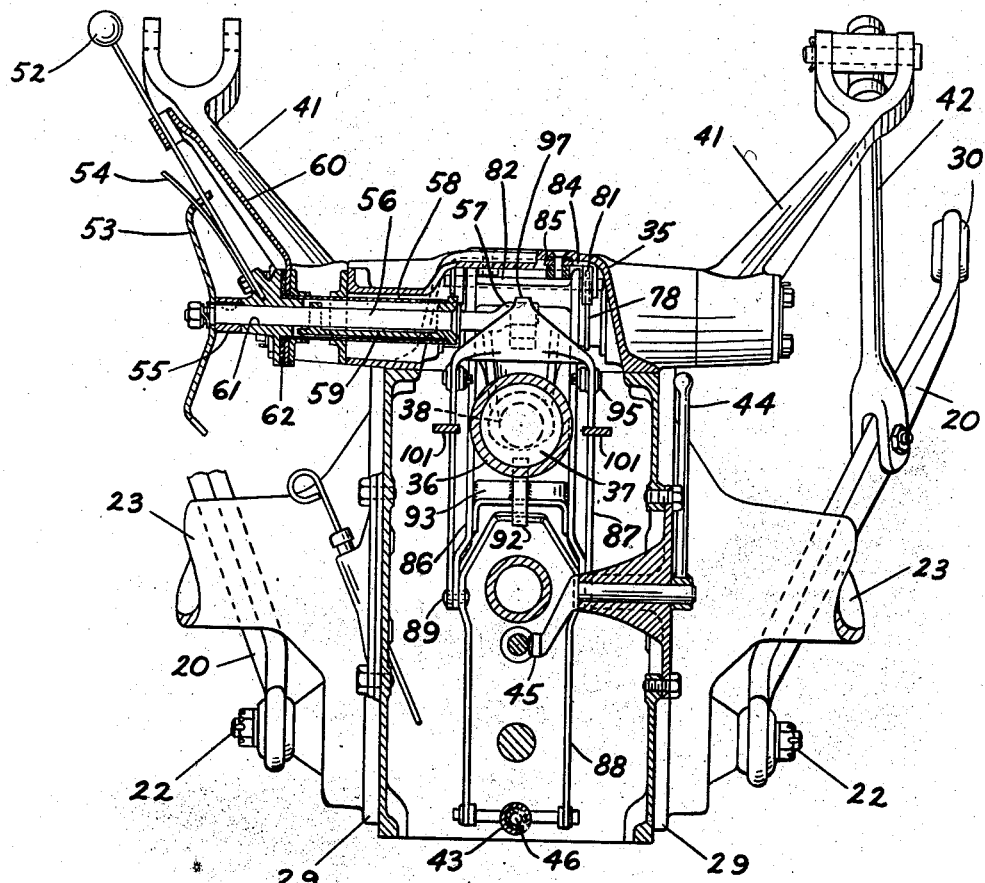
Fig. 5 is a transverse sectional view taken substantially along the line 5—5 in Fig. 2 but showing the quadrant shaft assembly in longitudinal section.

Change-over from automatic draft control to position control can be accomplished in the present mechanism simply by flipping a selector bar 53 arranged adjacent the quadrant lever 52 (Fig. 5). This selector bar is notched at its opposite ends to receive a leaf spring latch 54 fixed to the outside of the quadrant lever 52. Moreover, one side of each notch in the selector bar is extended sufficiently to form an abutment for the quadrant lever itself. The latter lever is resilient so that it may be sprung inward, when pulled toward the driver, to free it from the notch. When the notched end of the selector bar 53 marked "P" (Fig. 8) is engaged with the quadrant lever, the system is conditioned for position control. Alternatively, when the selector bar is turned through 180 degrees and the opposite notched end marked "D" is engaged with the quadrant lever, the system is conditioned for automatic draft control.

Upon reference to Fig. 5, it will be observed that the selector bar 53 is fixed to a bushing 55 keyed to the outer end of a shaft 56 having an eccentric or crank 57 at its inner end. This shaft 56 passes axially through a tubular sleeve 58 fixed transversely of the upper portion of the housing 35 and arranged with the shaft 56 projecting in such housing. An inner supporting member or cradle 59, turnable freely within the sleeve 58, receives shaft 56 and locates it with a slight eccentricity to the sleeve 58. The cradle 59 has a tang at its outer end received in a notch in the quadrant lever hub so that the cradle and hub turn together. The quadrant or guide 60 for the quadrant lever 52 is fixed to the sleeve 58. The quadrant lever 52 itself is fixed to a flanged hub member 61 freely journaled on the shaft 56 and received between the bushing 55 and the quadrant 60, a friction disc 62 being interposed between the quadrant and hub 61. Taking up on a nut at the outer end of the shaft 56 draws up on the friction disc to adjust the retaining friction afforded in holding the quadrant lever in place.

With the quadrant lever 52 latched to the selector bar 53, swinging of the quadrant lever turns the shaft 56, moving the eccentric 57 through a corresponding arc. Turning the selector bar 53 between its alternative positions of latching engagement with the quadrant lever turns the eccentric 57 through 180 degrees about the axis of the shaft 56, locating it for coaction with alternatively available associated parts hereinafter described for effecting "draft control" operation in the one case and "position control" operation in the other. Fig. 6 shows the parts in transition from position control to draft control.

In the construction of Fig. 5 such 180 degree turning of the shaft 56 by the selector bar 53 also effects a small bodily lateral shift of the shaft 56 due to its eccentric mounting in the cradle 59. That is done to accomplish proper location of the eccentric 57 for coaction with parts later described. In some cases, however, that additional shift can be dispensed with where the parts on which the eccentric 57 acts are so located that no such additional shift is necessary. In such a construction the shaft 56 can, for example, be concentrically mounted in a pressed metal sleeve 58A (Fig. 7) and the intermediate member 59 omitted.

Draft responsive device

For use in automatic draft control operation a draft responsive device is provided. Similarly, for use in position control a position responsive device is used. One or the other of these two devices is brought into play by the selector bar 53 heretofore identified. These two devices will be described in this and the immediately succeeding section of this specification preliminary to the description, which will thereafter follow, of their conjointly acting mechanical connections to the valve mechanism.

Turning first then to the draft responsive device (see Fig. 2), the same is comprised in an assembly mounted on the upper portion of the differential housing 29 for coaction with the top link 21. Included in this assembly is an axially slidable control plunger 63 and a single control spring 64. In general, the arrangement is such that the plunger 63 will be displaced axially proportionately to changes in draft load or horizontal resistance to movement applied to an implement attached to the hitch linkage—and from substantially the very inception of the application of such load.

Special emphasis must be given in that statement to the phrase "from substantially the very inception of the application of such load." Thus, in the basic draft control system of Ferguson Patent 2,118,180, the control spring and plunger there employed are so arranged that the plunger will be displaced when the top hitch link is under compression, and only then.

Considering the moments acting on the implement tending to rock it in a fore and aft direction about its pivotal connections to the lower links 20, it will be noted that the top link 21 is put under compression only after the draft load or horizontal resistance to movement acting on the implement has become great enough to set up a forwardly rocking moment on the implement which will overcome the opposed moment due to the overhanging or rearwardly acting weight of the implement and downward suck on the implement. Indeed, up until the time such weight and suck are overmatched by the horizontal draft load on the implement, the top link is under tension rather than compression. All that is explained more fully in my joint application with John M. Chambers, Serial No. 572,158, and we have, moreover, disclosed and claimed in said application an arrangement for subjecting a control spring to stress, and displacing the control plunger, from substantially the very inception of application of draft load and while the top link is under tension.

In the particular mechanism disclosed in said joint application, however, provision is made for stressing the control spring in compression both during the time that the top link is under tension as well as when it is under compression. That necessitates a very ticklish initial dual adjustment for the control spring and plunger which is costly for large scale factory production. On the other hand, adjustment of the control spring in such an arrangement as that of my joint application is very important where the spring is compressed from one end in response to tension in the top link and compressed from the other end in response to compression in the top link. It is important because any looseness of the spring would result in overcontrol at a point where the force in the top link passes from tension to compression or vice versa. On the other hand, if the spring were slightly compressed at this same point due to improper adjustment, there would be a range of no control due to the force in the top link having to be great enough to overcome the preloading in the spring in either direction. There is moreover, the possibility that temperature changes would alter the length of the spring, spoiling the adjustment irrespective of the nicety with which it was originally made.

In the presently disclosed arrangement the control spring 64 is stressed in tension when the top link 21 is under tension and is stressed in compression when the top link is under compression. That, of course, is to be contrasted with the previously mentioned arrangement of my joint application, Serial No. 572,158, in which the control spring is stressed in compression both when the top link is under tension and when it is under compression. As a result of that change in mode of operation, it is possible with the present setup to adjust the initial position of the plunger 63 in its path of travel simply and easily with but a single adjustment device and without changing the control spring stress. Initial adjustment of plunger position is requisite in setting up the system since it is mechanically connected to the valve mechanism as later described herein.

Upon reference to Fig. 2 it will be observed that in present arrangement the control spring 64 is fixedly attached at its opposite ends to the tractor housing 35 and to the rocker 26. For that purpose the control spring, which is helical in form, is threaded in helical grooves 65, 66 in a pair of end plugs 67 and 68. The diameter of the grooves is slightly greater than the unstressed portions of the spring which engage it so that it will firmly grip the plugs.

The front end plug 67 is flanged as indicated at 69 and fixed to a machined face 70 on the tractor housing 35 by a retaining ring 71 which is screwed to such housing. The other or rear plug 68 has a rearwardly projecting eye 72 integral with it and which receives a transverse attaching pin 73, pivotally connecting the same to the rocker 26. It will thus be seen that as the rocker is swung rearwardly, upon application of tension to the top link 21, the control spring 64 is stressed in tension. Conversely, when the rocker is swung forward, by compression on the top link, the control spring is stressed in compression.

The control plunger 63 is slidably received in an axial bore 74 in the front plug 67 whereas the rear end of this plunger is screwed into a threaded axial bore 75 in the rear plug 68. The plunger is thus slid or displaced axially with reference to the stationary front plug 67 as the rear plug 68 moves with tensioning or compressing of the control spring. Overtravel of the control plunger 63 during compression of the control spring 64 is prevented by a sleeve or bushing 76 of suitable length which loosely encircles the rod and is interposed between the opposing faces of the end plugs 67 and 68. Overtravel of the ccontrol plunger in an outward direction upon application of tension to the control spring is prevented by a head 76' on the inner end of the control rod arranged to abut against a shoulder in the counterbored inner end of the plug bore 74.

To adjust the position of the control plunger 63 to any desired point of displacement for a corresponding spring displacement or stress is a simple matter. All that needs be done is to thread the plunger into or out of the rear end plug 68. For that purpose the forward end of the plunger is slotted to receive the teeth of a suitable wrench. After adjustment a setscrew 77 can be tightened to lock the plunger securely in adjusted position.

Position responsive device

In so-called "position control," the draft links 20 have a follow-up action with reference to the quadrant lever 52. As previously mentioned, I have disclosed in my earlier application Serial No. 712,125 an arrangement for converting the basic draft control system of Ferguson Patent 2,118,180 for position control operation. Broadly stated, the arrangement disclosed and claimed in such application entails the employment of cam mechanism actuated in unison with rise or fall of the draft linkage for automatically restoring the hydraulic valve mechanism to neutral when the system reaches a control point established by position of the quadrant lever.

The presently disclosed position control arrangement follows those same general principles. It involves, however, a number of important improvements as compared to the exemplary arrangement disclosed in my earlier application noted above. Particularly to be pointed out in that respect is the fact that with the present mechanism any change in top link stress that takes place while position control is in use will not affect the system inadvertently or otherwise so long as the system remains conditioned for position control. That holds true up until emergency load conditions are reached and at that time the system will be safely released. Complete independence in an operational sense between automatic draft control and position control is thus accomplished in the present mechanism except in the desired special case of emergency overload. In a mechanical sense, however, the two controls are closely interrelated, as will later appear hereinafter, particularly in the next succeeding section of this specification.

The position responsive device comprises in the present system a pair of edge cams 78 (Figs. 2 and 3) fixed to the rockshaft 40 to turn in unison with it. These cams are desirably blanked out of thin sheet metal spring stock suitably heat treated. Central tangs 79 on the cams are entered in holes of controlled depth drilled in the rockshaft 40. The cams are positioned laterally on the shaft by their reception in shallow grooves 80. The horn shaped ends or legs of the cams partially embrace the shaft. The cams thus bear a general resemblance to snap rings and are held in place by the tension produced in the cam legs when embracing the shaft.

The active edges of the cams 78 are contoured to provide a central point of maximum rise and from which the cam edge recedes smoothly toward its opposite ends. The central or high portion of each cam edge is substantially arcuate, being concentric with the center of the rockshaft 40.

Coacting with the cams 78 is a corresponding pair of cam follower rollers 81 (Figs. 2 and 3). These rollers are mounted on opposite ends of a transverse pin or shaft 82 received in a pair of horizontal guide slots 83. Consequently, the follower rollers are displaced bodily in a lateral direction (fore and aft of the tractor) as the cams turn with the follower rollers retained in contact with the same.

The guide slots 83 may be fashioned in any suitable form of support. In the present instance they are formed in the depending side walls of a pair of brackets 84 of inverted L-shape, bolted to the underside of the roof of the housing 35. Slots in the upper sides of the brackets, receiving the mounting bolts, permit of endwise adjustment of the brackets while spacing washers 85 permit of vertical adjustment and squaring of the same to effect proper location of the follower rollers with reference to the actuating cams 78.

In general, it will be observed that so long as the follower rollers 81 are maintained in contact with the cams 78 the lateral displacement of the follower rollers (endwise of the guide slots 83) will be proportionate to the angular position of the rockshaft 40. Their displacement is, as a matter of fact, proportionate to the position of the piston 37 and all parts which move in unison therewith including the shaft 40, crank arms 41, drop links 42 and lower draft links 20. When in the position shown in Fig. 2 the follower rollers 81 are in contact with the high points of the cams 78 and are thus displaced a maximum distance in a leftward or forward direction. In such case, the draft links 20 are fully elevated. As the draft links descend, the rockshaft 40 turns clockwise or rearward so that the follower rollers move gradually to the right until they attain substantially their full rightward displacement when the draft links reach their fully lowered position.

Connecting linkage to valve mechanism

A linkage type of mechanical connection is provided for actuating the valve plunger 46 under the conjoint action of either the quadrant lever 52 and control plunger 63 (for automatic draft control), or of that same quadrant lever and the position control cams 78 (for position control).

Such linkage (see particularly Fig. 9) is suspended from the pin 82 on which the cam follower rollers 81 are mounted. This linkage or system of levers includes as its principal elements a position control fork 86, a draft control fork 87 and a lower fork 88. These three forks are arranged to form a more or less Y-shaped assembly (Fig. 2), the forks 86, 87 forming the arms of the Y and the lower fork 88 the stem. The bottom ends of the arms of the lower fork 88 are pivotally connected to the valve plunger 46 (Fig. 4) so that the latter is slid in or out as this fork 88 moves forward or back. Near their upper ends the side arms of such lower fork 88 are pivoted at 89 (Fig. 9) to the lower ends of the forks 86 and 87. These same pivots also form a pivotal connection between such two upper forks 86, 87.

Figure 9:
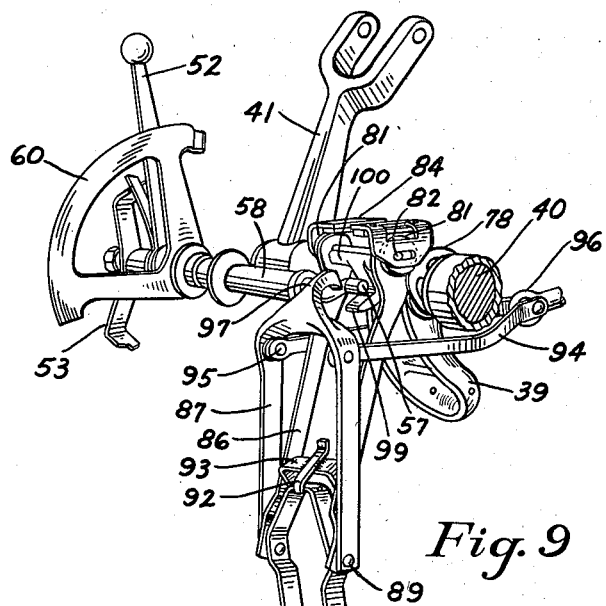
Fig. 9 is a fragmentary perspective view of the operating lever or link assembly of the system and certain associated parts.

A pair of contractile springs 90 (Figs. 3 and 2) tends to pull all three of the forks forward. The springs 90 are anchored at one end to a spreader 91 pivotally mounted on the underside of the cylinder 36 and at the other end are anchored to the upper portion of the lower fork 88 at a point above its pivots 89. The springs 90 thus tend to rock the upper end of the lower fork 88 forward (counterclockwise) about its pivots 89. The latter motion is, however, limited by the lower end of a stop or bracket 92 fixed to a crossbar 93 joining the lower portions of the side arms of the position control fork 86 (Figs. 5 and 9). It will be noted that a sort of knee-action motion of the upper position control fork 86 with reference to the lower fork 88 about the pivots 89 is permitted by stretching of the springs 90. Such knee action motion or "breakout" action of the linkage is provided in order to prevent damage to the linkage mechanism through any tendency to overtravel in a rearward direction. Such tendency to overtravel may occur under any one of the five following operative conditions: First, upon application of an emergency overload; second, upon a rapid downward movement of the quadrant lever 52 under either position or draft control conditions; third, upon the application of an excess load in tension when the system is set for draft control; fourth, upon rotation of the rockshaft 40 in a raise (counterclockwise—Fig. 2) direction by an external force, and five, upon changeover from one control to the other.

A yoke 94 (Fig. 9) connects the draft control fork 87 with the slidable control plunger 63. For that purpose the forward end of the yoke 94 is pivoted at 95 to the upper portion of the draft control fork. At the rear end of the yoke a screw eye 96 is pivoted between the arms of the yoke, its rearwardly projecting screw portion being threaded in the forward end of the control plunger. As the plunger 63 is displaced endwise (in accordance with changes in draft load as heretofore described) the draft control fork 87 is likewise permitted to rock forward or back under the influence of the contractile springs 90. This in general results in a corresponding fore or aft shift of the pivot point 89 to swing the other two forks 86, 88 (which under this condition act as a unit or single lever) about the pin 82 as a pivot point to shift the valve plunger 46 and admit or exhaust fluid as may be required to restore the system to a preset value of draft load. Of such over-all operation of the system more will shortly appear below. For the moment, the concern is primarily with the identification of the structural elements of the illustrated connections.

During automatic draft control the quadrant lever 52 coacts with the draft control fork 87 to alter the effective over-all length of the mechanical connection from the control plunger 63 to the valve plunger 46. Change in that length correspondingly alters the point in the travel of the control plunger at which the valve reaches its neutral position. Consequently, by shifting the quadrant lever the "control point" of the system or, in other words, the draft load at which the system comes to neutral, with the system in equilibrium, may be correspondingly adjusted at will.

To establish such an adjusting action from the quadrant lever 52 a hook-shaped projection 97 (Fig. 13) is provided on the upper end of the draft control fork 87. This projection terminates in an inclined bearing pad 98 faced generally toward the eccentric 57. During normal draft control operation the springs 90 tend to retain the pad 98 in contact with the eccentric. As the quadrant lever 52 is swung downward the eccentric 57 pushes against the pad 98, rocking the fork 87 counterclockwise about the pivots 95 to shift the common pivot point 89 rearwardly, whereas when the quadrant lever is moved upward the eccentric tends to withdraw from the bearing pad, permitting the contractile springs 90 acting upon the common pivot 89 through forks 86, 88 to swing the fork 87 clockwise about the pivots 95.

In a somewhat similar manner, the quadrant lever 52 can also be used (Figs. 10, 11 and 12) to vary the effective over-all length of mechanical connection between the position control cams 78 and the valve plunger 46 to correspondingly vary the control point as desired during the position control operation. For that purpose a depending hook-shaped member 99 (Figs. 3 and 9) is fashioned integral with a cross member or top bar 100 which is in turn integral with the position control fork 86. This hook extends generally vertically of the eccentric 57 on the side thereof opposite to the pad 98 and presents a bearing surface for contact with the eccentric when the eccentric is located by the selector bar 53 for position control operation. Swinging the quadrant lever 52 downward during position control operation causes the eccentric 57 to push the hook-shaped member 99 and attached position control fork 86 rearward (Fig. 11) thereby rocking the forks 86, 88 rearward or counterclockwise about the upper pin 82 and stressing the contractile springs 90. Conversely, raising the quadrant lever tends to withdraw the eccentric 57 from the hook member 99 thereby permitting the contractile springs to swing the forks 86, 88 in an opposite or clockwise direction about the upper pivot pin 82.

Neglecting for the moment the "breakout" action which takes place under special conditions, as above mentioned, it will be perceived that during draft control operation the fork 87 fulcrums about the eccentric 57 with motion imparted by the control plunger 63, and fulcrums about the pivots 95 during adjustment for draft by the eccentric 57. Similarly, during position control operation the forks 86, 88 act as one long rigid floating lever fulcruming about the eccentric 57 with motion imparted by the cams 78, and fulcruming about the pin 82 during adjustment for position by the eccentric 57.

Draft control operation

Let it be assumed that some suitable ground-working implement, such as the plow 31, has been attached to the hitch linkage 20, 21 and that the implement is being held in an elevated or transport position with the draft linkage fully elevated. In such case the quadrant lever 52 will be in its fully raised position, as shown in Fig. 2, although the upper link will be in tension so that the parts associated therewith will be substantially as shown in Fig. 13. Moreover, the valve plunger 46 will be in its neutral position although the sequence of events which brings it there will be described in the next succeeding section of the specification. Let it also be assumed that the selector bar 53 has been turned to its draft control position previously described.

In such case the tractor is driven forward and when it reaches the place where working of the soil is to begin the operator has only to swing the quadrant lever 52 forward to lower the implement toward ground-working position. Such forward swing of the quadrant lever moves the eccentric 57 to rock the draft control fork 87 counterclockwise, shift pivots 89 rearwardly and swing the other forks 86, 88 as a unit counterclockwise about the pivot 82 from the position of Fig. 2 to that of Fig. 13. The valve plunger 46 is thus moved rearward, uncovering the bleed ports 48 so that fluid is permitted to exhaust from the ram cylinder 36 with a consequent lowering of the draft linkage. The weight of the implement sustained by the draft linkage has stressed the top link 21 in tension and accordingly has exerted a tensioning stress on the control spring 64. Note that in Fig. 13 the plunger 63 is at the rearward extreme of its path of travel. When the implement is grounded this tension is at least somewhat relaxed so that the control plunger is moved forward by the control spring 64. This forward displacement of the control plunger in turn permits the contractile springs 90 to fulcrum the fork 87 clockwise about the eccentric 57 to allow the valve plunger 46 to shift back to its neutral position (Fig. 14) where further escape of fluid from the ram cylinder is blocked.

The actual extent to which the control plunger 63 must move forward before the valve plunger 46 is restored to neutral depends upon the extent to which the quadrant lever 52 has been depressed or, in other words, the extent to which the quadrant lever has shifted the fulcrum point eccentric 57. With the present system a small forward movement of the quadrant lever causes the system to be restored to its control point or balanced condition with only a small relaxation in tension on the top link 21. Further forward movement of the quadrant lever progressively changes the control point so that there must be a greater and greater relief of tension in the top link and thereafter imposition of an increasingly greater compression in the top link before equilibrium is restored in the system. It will be perceived that as the plow bottoms (Fig. 1) dig deeper the draft load increases until it is great enough to overcome the weight and suck of the implement so that the implement tends to rock forward (about the transverse axis at its points 30 of pivoted connection to the lower draft links 20) and compress the top link 21, that compression being increased with increased draft load. By simple finger-tip adjustment of the quadrant lever position, the control point for the system can be changed to correspond to any desired value of draft load throughout an extremely wide range varying from the very light value encountered with cultivators, etc., to the extremely heavy values encountered with a deep running two-bottom plow.

Once the desired control point or draft load has been established by setting of the quadrant lever 52, the system will operate automatically not only to attain but also to retain that value. With the implement in working position (Fig. 14) should the draft load increase above the desired value there will be a resultant increment of inward movement of the control plunger 63. This will permit of clockwise rocking of the fork 87 about the eccentric 57 as a fulcrum under the influence of the springs 90, moving the valve plunger 46 over until the intake ports 47 are uncovered. Thereupon, further pressure fluid is delivered by the pump 43 to the ram cylinder 36, raising the draft linkage. That makes the implement run shallower, decreasing the draft load until the desired value is again reached. In approaching such control point value the control plunger 63 moves outward again, restoring the valve plunger 46 to neutral. Similarly, if the draft load decreases below the control point value, there will be an ensuing outward movement of the control plunger 63 with a resultant rocking of the fork 87 counterclockwise about the eccentric 57 so that the exhaust ports 48 are uncovered and the implement thus lowered to run deeper. As that action continues the draft load increases, with an inward movement of the control plunger 63 ensuing, until the system is again restored to a condition of equilibrium at the control point value of draft load.

It will be appreciated that with a uniform soil the draft load will be proportionate to the depth at which the implement runs. It is for that reason that what has been referred to herein as "automatic draft control" is often referred to in the field as "automatic depth control." In operating the quadrant lever 52 to increase or decrease draft load the farmer usually thinks and speaks of it as adjusting the "depth" at which he is plowing or cultivating. That should, however, occasion no confusion and the term "automatic draft control" has been given preference here because it is technically somewhat more exact than "depth control."

Hoisting for transport

To hoist the implement into fully elevated or transport position where it is clear of the ground, a driver has only to swing the quadrant lever 52 to its uppermost position (Fig. 14 to Fig. 2). Upon so doing, the eccentric 57 is swung away from the co-operating pad 98, thus permitting the contractile springs 90 to rock the fork 87 clockwise, shift pivot 89 forwardly and allow the fork unit 86, 88 to swing clockwise about the pin 82 as a center. The valve plunger 46 is thereby pushed leftward, uncovering the supply ports 47 so that further pressure fluid is pumped into the main ram cylinder 36.

That action continues with accompanying elevation of the draft linkage. It is desirable that there should be an automatic cutoff for the fluid supply at completion of a normal or proper rise for the draft linkage. In the basic system of Ferguson Patent 2,118,180 such cutoff is accomplished by permitting the emerging end or skirt of the ram piston to contact the floating lever which connects the quadrant lever eccentric and valve mechanism. In such basic system that accomplished cutoff at a fixed point of rise for the draft linkage since the automatic draft control mechanism had a fixed position whenever a tension load was applied to the top link. However, the special form of draft responsive mechanism 63, 64 here employed makes that impossible. Thus, in the present system the control plunger 63 will, during transport, have a variable position of endwise displacement depending upon the weight of the particular implement which is attached to the hitch linkage 20, 21. That variable displacement will impart a correspondingly variable displacement to the draft control fork 87. Consequently, it is not possible to use contact between some projection on that fork and the emerging skirt of the piston 37 to accomplish a fixed point cutoff for the system. Because of that difficulty a quite different arrangement has been employed here, utilizing certain elements of what are primarily components of the position control system.

In particular, it will be observed upon reference to Fig. 2 that when the crank arms 41 and attached draft linkage are in a desired fully elevated position (such as that shown), the high points of the position control cams 78 are in contact with the follower rollers 81. The pin or shaft 82 which carries these rollers is thus retained in a fixed position at the forward ends of the guide slots 83. Such position is unaffected by the displacement, if any, which the control plunger 63 has at the moment. Accordingly, this pivot point for the control fork 86 is used as a fixed point of reference for determining the amount of projection for the ram piston 37 at which automatic cutoff of the system shall take place under either position or automatic draft control.

For that purpose the stop bar 92 (Figs. 9 and 10) is extended upward to form an abutment positioned to intercept the skirt of the ram piston 37 as the latter emerges from the cylinder 36. When the piston skirt strikes this abutment the position control fork 86 is rocked counterclockwise about the pin 82 as a center, thereby drawing the lower fork 88 rearward. The valve plunger 46 is thus also drawn rearward to close the supply ports 47 and the system is brought to rest in neutral (Fig. 2). Should there be any leakage of fluid so that the piston 37 tends from time to time to creep back into the cylinder away from the abutment 92, there is a resultant leftward swing of the lower fork 88 so that the intake ports 47 are uncovered and the piston quickly restored to its terminal position. The system is, of course, cut off again just as before, when restored to full transport position. During this cutoff operation, and with eccentric 57 withdrawn by the upward positioning of quadrant lever 52, movement of fork 87 will have no effect on the system.

Position control operation

For some types of operation, usually dictated by the character of the particular implement employed, it is desirable that the system operate on the basis of "position control" rather than "draft control." By way of example, if a crane (not shown) or other carrying or loading implement is attached to the hitch linkage 20, 21 the possibility of automatic draft control is not present since there is no draft load involved. Such a device can be lifted and lowered between two extreme positions with the basic system of Ferguson Patent 2,118,180 but more precise control with stoppage at intermediate points is often desirable. The present system makes that possible since when it is conditioned for "position control" the lower draft links 20 have a follow-up action with reference to the quadrant lever 52, moving into positional agreement with it whenever it is shifted. During such operation the lower links assume a new angular position, corresponding to that of the quadrant lever, upon each repositioning of the latter.

Considering now the operation during position control, let it be assumed that the selector bar 53 has been turned to its position control location and in which the notched end marked "P" is engaged with the quadrant lever 52. Let it also be assumed that the draft links 20 are in their fully elevated position and the quadrant lever 52 likewise in its fully raised position (see Fig. 10). It may be noted in passing that it is easiest to turn the selector bar 53 for shifting from automatic draft control to position control, or vice versa, when the draft links 20 are lowered rather than in such raised position although it is not essential that the change-over be with the draft links lowered. It is easiest to do it then since the least force is required in turning the selector bar. That is for the reason that the position control cams 78 are at such time located (see Fig. 6) to allow maximum rearward movement of the position control fork 86. Accordingly, a minimum amount of "breakout" in the linkage (i. e. rearward motion of the lower fork 88 away from the stop 92 while stressing the springs 90) is required in making the shift. Note that the breakout is shown in Fig. 6, the eccentric 57 there being just about on dead center as it passes from position control position to draft control position. Any such breakout movement is, of course, resisted by the contractile springs 90 and which must be overcome by the operator in turning the selector bar 53.

With the system conditioned as described above (i. e. elevated for transport as in Fig. 10) the draft links 20 may, for example, be swung down to some desired intermediate position by lowering the quadrant lever 52 to a corresponding intermediate position. In such case the lowering of the quadrant lever (e. g. from the position of Fig. 10 to that of Fig. 11) tends to move the eccentric 57 rearward against the nose of the hook 99 so that the position control fork 86 and the lower fork 88 are swung rearward, stressing the springs 90. The valve plunger 46 is thus drawn rearward, uncovering the bleed ports 48 (Fig. 11). Fluid is thereupon exhausted from the ram cylinder 36 so that the draft links 20 are lowered.

Figure 12:
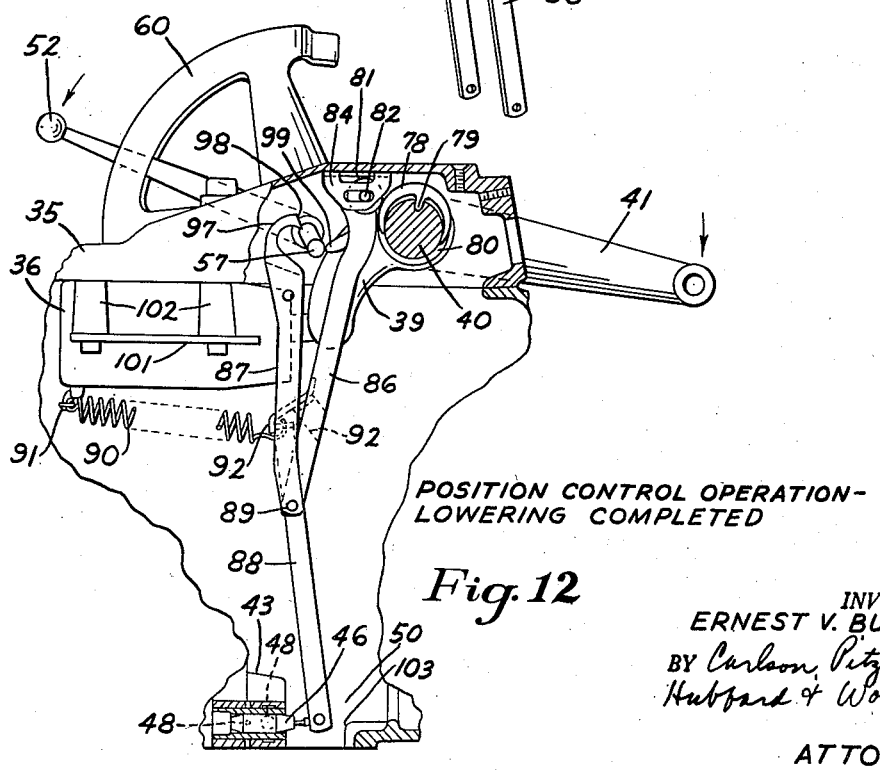

As the draft links descend, the rockshaft 40, of course, turns rearwardly and the position control cams 78 on it also turn rearwardly. The position control cams, retreating from the follower rollers 81, thus permit them to move rearward under the urging of the springs 90 so that the forks 86, 88 tend to rock clockwise or in a rearward direction about the eccentric 57 as a fulcrum. When the draft links 20 reach a height corresponding to the new position of the quadrant lever 52, such fulcruming movement of the forks 86, 88 has been sufficient to restore the valve plunger to its neutral position (Fig. 12).

In any subsequent relocation of the quadrant lever 52 the draft links 20 are automatically caused to follow it in substantially the same manner. For example, if the quadrant lever is raised from the position of Fig. 12, its raising movement rocks the eccentric 57 away from the follower hook 99, permitting the latter to be drawn forward resulting in a swing of the forks 86, 88 about the pivot pin 82 by the springs 90. The valve plunger 46 is thus shifted forward to uncover the intake ports 47 so that additional fluid is delivered to the ram cylinder 36. With such delivery of fluid the draft links rise and the position control cams 78 turn forward or counterclockwise. In the course of such turning of the position control cams they push the follower rollers 81 forward, rocking the forks 86, 88 rearward about the nose of the hook 99 bearing on the eccentric 57 as a fulcrum. When the draft links finally reach a raised position corresponding to the new location of the quadrant lever 52, the valve plunger 46 has been thrust rearward sufficiently to reclose the intake ports 47 and thus bring the system again into equilibrium.

When the quadrant lever is fully raised to transport position the system is automatically cut off upon completion of full raising of the draft linkage in the same manner as previously described (in connection with automatic draft control). In other words, the same cut-off action takes place upon full raising of the linkage whether the system be conditioned for automatic draft control or for position control. In either case the skirt of the ram piston 37 emerges from the cylinder 36 and strikes the abutment 92 and rocks the forks rearward about the high points of the position control cams 78 as fixed fulcrum points, bringing the valve plunger 46 into neutral position (Fig. 10 for position control, Fig. 2 for draft control).

Upon analysis of the setup, it will be perceived that when the system is conditioned for position control any changes in stress on the control spring 64, short of an emergency overload condition, will be ineffectual to impair or alter the positioning control action. That is important because during position control it is quite possible that the control spring may be stressed by the implement or otherwise and sometimes quite inadvertently.

With the arrangement herein disclosed the eccentric 57 forms an effective fulcrum for either the position control fork 86 (Figs. 11 and 12) or for the draft control fork 87 (Fig. 14) but never for both at the same time. As soon as its fulcruming action is withdrawn from one fork or the other by turning the selector bar 53, the fork from which it is withdrawn becomes a more or less freely swinging lever, ineffectual to move the control valve mechanism. For example, when the eccentric 57 is located for position control as shown in Fig. 12, the draft control fork 87 is free to swing back and forth about its lower pivots 89 in response to movement of the control plunger 63 without imparting any movement to the lower fork 88 and hence to the valve plunger 46. For that reason the stress on the control spring 64 can be altered at will during position control without interfering with the latter action, since the resultant movement of the control plunger 63 and the draft control fork 87 will not have any effect. Similarly, when the eccentric 57 is engaged with the draft control fork 87 (Fig. 14) for automatic draft control operation, the position control fork 86 does not and cannot fulcrum about the eccentric 57 but instead serves simply as a more or less freely swinging support for othe other two forks 87 and 88.

Only outside the normal range of draft or positioning control do any exceptions occur for the described independence of action for the draft control and position control forks 86 and 87 accomplished by the selective positioning of the eccentric 57. One of these exceptions is the cut-off action for the system accomplished when the linkage is raised to full transport position with the system conditioned for automatic draft control (Fig. 2) and which has been previously described in some detail. The other is another more or less extreme or special condition to which some general reference has previously been made, namely, emergency overload, and which will be detailed in the next succeeding section of the specification.

*Emergency overload release*

Special provision has been made for unloading the system automatically under the emergency condition which arises when some draft load supervenes which exceeds a safe value. Such condition arises, for example, when a plow strikes an underground boulder or stump. As taught in Henry George Ferguson Patent No. 2,118,181, it is desirable under such conditions that the pressure fluid be released from the main ram so that the traction load on the tractor's rear wheels is relieved and they can spin freely, thus avoiding damage to the implement.

In the present system the mechanism is so arranged that such emergency release takes place automatically upon application of draft load in excess of a predetermined maximum value and irrespective of whether the system happens to be conditioned for automatic draft control or for position control. It should be particularly noted that this invervention of automatic safety release in response to overload takes place during position control despite the fact that changes in draft load short of any such emergency value have no effect on the system whatever during such position control operation.

In general, that desirable intervention of automatic safety release during either draft control or position control operation is brought about by arranging matters so that upon application of overload the floating lever or fork assembly 86, 87, 88 will be fulcrumed about an additional fulcrum point which comes into play at such time and without depending upon the eccentric 57 as a fulcrum point at all. In the exemplary installation here shown, such special fulcrum is provided by the rear ends of a pair of abutment or stop bars 101 (Fig. 15) mounted along opposite sides of the ram cylinder 36 on studs 102. With the parts so arranged, when the control plunger 63 lunges forward to the full extent of travel permitted by the bushing 76 under application of an emergency overload, the draft control fork 87 is thrust forward so far that it contacts the stops 101 and fulcrums forwardly or counterclockwise about them. This results in rearward motion of the lower fork 88 which draws the valve plunger 46 rearward to uncover the bleed ports 48 so that pressure is relieved in the ram cylinder 36 and the draft linkage 20, 21 tends to drop, thereby relieving the traction load from the rear wheels 24 of the tractor. Fig. 15 shows the system released for overload during automatic draft control operation but the parts are located just the same upon overload release during position control except that the eccentric 57 is turned through 180 degrees from the position shown.

Rearward motion of the lower fork 88 is limited by contact of its lower end portion with a boss 103 in the bottom of the tractor housing 35 so that the intake ports 47 cannot also be uncovered by excessive motion of the valve plunger 46. The breakout action previously mentioned serves, however, to prevent breakage of the forks themselves even though the travel of the lower end of the lower fork 88 is positively limited by the boss 103. Thus if the control plunger 63 continues to move forward (under overload) after the lower fork 88 strikes the boss 103, a scissoring or knee action motion of the forks 86, 88 will ensue. The fork 87 will continue rocking forward about the fulcrums 101 and the fork 88 will rock rearward about the boss 103. The upper end of the fork 88 will leave the stop 92, stressing the springs 90 still further (see Fig. 15).

I claim as my invention:

1. The combination of a tractor having a vertically movable hitch linkage thereon, a hydraulic power unit powered from the tractor's engine and connected to said linkage for raising and lowering the same, said power unit being equipped with a valve mechanism shiftable from a neutral "off" position in respective opposite directions alternatively into raising or lowering positions therefor, an axially slidable plunger mounted on the tractor, means for applying to said plunger a force corresponding in magnitude and sense to the sum of the moments acting on an implement pivotally trailed from said hitch linkage and tending to rock said implement fore and aft about the linkage, a stretchable and compressible control spring anchored at one end to the tractor and at the other to said plunger for yieldably resisting in tension displacement of the latter in one direction and in compression displacement in the other direction under the urging of said force, means including a floating lever mechanically interconnecting said plunger and valve mechanism for effecting a shift in the latter by displacement of said plunger, a fulcrum for said floating lever, a hand lever for adjustably shifting said fulcrum to thereby adjust the position of said floating lever with reference to said plunger and thus alter the point in plunger travel at which said valve mechanism is located in said "off" position.

2. The combination of a tractor having a pair of draft links trailingly pivoted on its rear end portion in side-by-side relation, a hydraulic power unit driven from the tractor's engine and connected to said draft links for raising and lowering the same, said power unit being equipped with a valve mechanism shiftable from a neutral "off" position in respective opposite directions into alternatively available raising or lowering postions, an axially slidable plunger mounted on the tractor, means including a top link trailingly pivoted from the rear end of said plunger and located above the first mentioned pair of draft links for applying to said plunger a force corresponding in magnitude and sense to the sume of the moments acting on an implement pivotally trailed from said first mentioned draft links and tending to rock said implement in a fore and aft direction, a stretchable and compressible control spring anchored at one end to said plunger and at the other to said tractor to yieldably resist in tension motion of said plunger in one direction and in compression in the other direction under the urging of said force, means including a floating lever mechanically interconnecting said plunger and valve mechanism for effecting a shift in the latter by displacement of said plunger, a fulcrum for said floating lever, a hand lever for adjustably shifting said fulcrum, and a manually operable device for adjusting the position of said floating lever with reference to said plunger to thereby alter the point in plunger travel at which said valve mechanism is located in said "off" position during any particular selected position of said fulcrum effected by said hand lever.

3. The combination of a tractor having a vertically movable hitch linkage thereon, a hydraulic power unit powered from the tractor's engine and connected to said linkage for raising and lowering the same, said power unit being equipped with a valve mechanism shiftable from a netural "off" position in respective opposite directions alternatively into a raising or lowering position therefor, an axially slidable plunger mounted on the tractor, means for applying to said plunger a force corresponding in magnitude and sense to the sum of the moments acting on an implement pivotally trailed from said hitch linkage and tending to rock said implement fore and aft about the linkage, a stretchable and compressible control spring anchored at one end to the tractor and at the other to said plunger to yieldably resist in tension displacement of the latter in one direction and in compression in the other direction under the urging of said force, a mechanical connection between said plunger and valve mechanism for effecting a shift in the latter by displacement of said plunger, and a mechanically operable device for adjusting the effective length of said connection to thereby alter the point in plunger travel at which said valve mechanism is located in said "off" position.

4. A draft responsive mechanism for use on a tractor in controlling automatically a power elevating unit for an implement hitch in response to changes in draft load on the implement comprising, in combination, a coiled control spring, a pair of plugs entered in opposite ends of the spring coil, the entering portions of said plugs being shaped to be circumferentially gripped by the spring so as to preclude axial movement of the plugs relative to the gripping portions of the spring, one of said plugs having means for rigidly attaching the same to the tractor, said one plug having an axial bore therein, a control plunger slidably received in said bore, and said plunger having a threaded connection with the other plug normally precluding axial movement of the plunger relative thereto while permitting limited axial adjustment of the plunger with reference to such other plug.

5. A draft responsive mechanism for use on a tractor in controlling automatically a power elevating unit for an implement hitch in response to changes in draft load on the implement comprising, in combination, a coiled control spring, a pair of plugs entered in opposite ends of the spring coil, the entering portions of said plugs being shaped to be circumferentially gripped by the spring so as to preclude axial movement of the plugs relative to the gripping portions of the spring, one of said plugs having means for rigidly attaching the same to the tractor, said one plug having an axial bore therein, a control plunger slidably received in said bore, said plunger having a threaded connection with the other plug for axial adjustment of the plunger with reference to such other plug, a rocker adapted to be pivoted on the tractor to rock in a fore and aft direction thereon, means pivotally connecting said rocker to said other plug with said plunger projecting in the general direction of rocker movement, and means for connecting the end of said plunger remote from said rocker to a control device for the power elevating unit.

6. The combination of a tractor having a vertically swingable draft linkage trailingly pivoted on its rear end portion and including upper and lower link elements, a hydraulic actuator mechanism on the tractor connected to said linkage for raising the same and including an engine driven pump supplying pressure fluid for such operation, a movable control member, means for causing said mechanism to effect raising or lowering of said linkage in response to shift of said member in respective opposite directions from a selected point therefor in its path of travel, means including an upper link element of said draft linkage for applying stress to said member tending to move the same in accordance with change in the sum of the moments acting on an implement pivotally connected to a lower link element of said draft linkage to rock fore and aft thereof, a control spring connected at one end to said control member, and means connecting the other end of said spring to a fixed anchorage point on said tractor so that said upper link is effective to stress such spring in either tension or compression depending upon the direction of the preponderance of moments acting on the implement.

7. The combination of a tractor having a vertically swingable draft linkage trailingly pivoted on its rear end portion and including upper and lower link elements, a hydraulic actuator mechanism on the tractor connected to said linkage for raising the same and including an engine driven pump supplying pressure fluid for such operation, a movable control member, means for causing said mechanism to effect raising or lowering of said linkage in response to shift of said member in respective opposite directions from a selected point therefor in its path of travel, means including an upper link element of said draft linkage for applying stress to said member tending to move the same in accordance with change in the sum of the moments acting on an implement pivotally connected to a lower link element of said draft linkage to rock fore and aft thereof, a control spring connected at one end to said control member, means connecting the other end of said spring to a fixed anchorage point on said tractor to enable said upper link to stress such spring in either tension or compression, and means for manually effecting a bodily adjustment of said control member with reference to said spring and along the path of travel of such member.

8. For use in an automatic draft control for ground-working implements of the type in which an axially slidable control plunger is subjected to stress in one direction by the overhanging weight of the implement when the latter is elevated and which stress gradually diminishes and finally changes to a progressively increasing stress in the opposite direction as the implement is lowered and ground reaction on the same progressively increased: the combination of a helical control spring disposed generally coaxially with said plunger and encircling the same in spaced relation, a pair of plugs fixed to opposite end portions of said control spring, one of said plugs being formed for connection to a fixed anchoring point and having an axial bore therein through which said plunger projects for free sliding movement with reference thereto, the other of said plugs being movable with said plunger in response to said stress changes to stress said spring in either tension or compression, and a threaded connection between said plunger and the other of said plugs by means of which said plunger may be axially adjusted with reference to said control spring.

9. The combination of a tractor having a draft linkage trailingly pivoted thereon to swing in a generally vertical direction, a hydraulic power unit on the tractor driven from the tractor engine and connected to said linkage for effecting raising and lowering of the linkage, said unit having a control valve mechanism operable to condition the same for raising or lowering and also having an "off" position, an axially slidable control plunger on the tractor, means including a floating lever connecting said plunger to said valve mechanism, a fulcrum for said lever, a manual device for shifting said fulcrum, a control spring attached at one end to a fixed anchorage point on the tractor and at the other end to said plunger so that it may be stressed either in tension or compression, a member comprising a part of said linkage for applying to said plunger a force corresponding in sense and amount to the sum of the moments acting on an implement pivotally attached to said draft linkage and tending to rock it in a fore and aft direction about such linkage, and a member movable in unison with rise of said draft linkage and located to intercept said floating lever and swing the same to shift said valve mechanism into "off" position irrespective of the prevailing displacement of said control plunger.

10. The combination of a tractor having a draft linkage trailingly pivoted thereon to swing in a generally vertical direction, a hydraulic power unit on the tractor driven from the tractor engine and connected to said linkage for effecting raising and lowering of the linkage, said unit having a control valve mechanism operable to condition the same for raising or lowering and also having an "off" position, a control plunger on the tractor connected to said valve mechanism and axially slidable in opposite directions from a mean position therefor in which said valve mechanism is in "off" position to shift such valve mechanism either into its raising or lowering position, a control spring attached at one end to a fixed anchorage point on the tractor and at the other end to said plunger, so that it may be stressed either in tension or compression, a member forming a part of the draft linkage for applying to said plunger a force corresponding in sense and amount to the sum of the moments acting on an implement pivotally attached to said draft linkage and tending to rock it in a fore and aft direction about such linkage, and means operable automatically in response to attainment of a predetermined elevation of said draft linkage for effecting a shift of said valve mechanism into "off" position irrespective of the prevailing displacement of said control plunger.

11. The combination of a tractor having a draft linkage trailingly pivoted thereon to swing in a generally vertical direction, a hydraulic power unit on the tractor having an open ended cylinder slidably receiving a piston connected to said linkage for effecting raising and lowering of the linkage, said unit having a control valve mechanism operable to condition the same for raising or lowering and also having an "off" position, an axially slidable control plunger on the tractor, means including a floating lever connecting said plunger to said valve mechanism, a fulcrum for said lever, a manual device for shifting said fulcrum, a control spring arranged to be stressed in tension upon displacement of said plunger in one direction from an intermediate mean position and in compression upon displacement of the plunger in the other direction from said intermediate position, a member forming a part of said draft linkage connected for applying to said plunger a force corresponding in sense and amount to the sum of the moments acting on an implement pivotally attached to said draft linkage and tending to rock it in a fore and aft direction about such linkage, and a swingable support for said floating lever positioned to be struck by said piston as it emerges from the open end of said cylinder at the end of its raising stroke and displaced in a direction to shift said floating lever for effecting a shift of said valve mechanism into "off" position irrespective of the prevailing displacement of said control plunger.

12. The combination of a tractor having an implement hitch trailingly mounted thereon and a power unit for raising and lowering such hitch, valve means for controlling the operation of said unit, a pivoted hand lever, alternatively available controls operatively associated with said valve means and said hand lever for actuating said valve means to effect, in the one case, automatic retention of a uniform draft load on said hitch at a value determined by the setting of said hand lever, and in the other case, raising or lowering of said hitch in positional agreement with the setting of said hand lever, and a selector located to turn on an axis substantially coincident with the pivot of said hand lever for rendering selected ones of said controls operative and disabling the other.

13. The combination of a tractor having an implement hitch trailingly mounted thereon and a power unit for raising and lowering such hitch, a pivoted hand lever, alternatively available controls for actuating said unit to effect, in the one case, automatic retention of a uniform draft load on said hitch at a value determined by the setting of said hand lever, and in the other case, raising or lowering of said hitch in positional agreement with the setting of said hand lever, each of said controls including a floating lever, a fulcrum for said floating levers fixed eccentrically with respect to the rotational axis of a turnable support, a releasable selector latch for connecting said support to said hand lever to turn in unison therewith and with said support held throughout such turning in either of two alternatively available positions of rotational displacement with respect to said hand lever, and said eccentric being located on said support for individual coaction with respective ones of said floating levers and freedom from the other in said two alternatively available positions of rotational displacement of said support.

14. The combination of a tractor having a driver's seat and a hand lever pivoted within convenient reach of such seat, a draft linkage trailingly pivoted for vertical swing on the rear portion of the tractor and a power unit for raising and lowering the same, alternatively available controls for actuating said unit to effect, in the one case, automatic retention of a uniform draft load on said hitch at a value determined by the setting of said hand lever, and in the other case, raising or lowering of said hitch in positional agreement with the setting of said hand lever, each of said controls including a generally upright floating lever having portions spaced apart from each other fore and aft of the tractor and being rockable generally fore and aft, a transverse shaft having an eccentric thereon disposed between said spaced portions of said levers to serve as a fulcrum for the rocking of alternative ones thereof during use of the corresponding control, said shaft being disposed with its axis in general agreement with the pivotal axis of said hand lever, a selector bar fixed transversely to said shaft and notched at its opposite ends to engage said hand lever for turning of said shaft in unison with such lever and with such shaft located in one or the other of two alternate positions of rotational displacement with reference to said hand lever, and said eccentric being located for individual fulcruming contact with respective ones of said floating levers while leaving the other free in said two alternative positions of said shaft and attached selector bar.

15. In a power operating system for an implement hitch movably mounted on a tractor, the combination of a hydraulic actuator, valve mechanism for controlling the supply and exhaust of pressure fluid to and from said actuator, a position responsive control member movable in proportion to change in position of the hitch, a draft responsive control member movable in proportion to changes in draft load on an implement attached to said hitch, a pair of operating levers, means pivotally connecting both of said operating levers to said valve mechanism, means for moving respective ones of said levers in response to shift of corresponding ones of said control members, and a manually shiftable fulcrum movable selectively into operative relation with alternate ones of said levers while leaving the other free for unimpeded idle bodily shift by its associated control member, to thereby put alternate ones of said control members in effective control of said valve mechanism without interference by the other.

16. In a power operating system for an implement hitch swingably mounted on a tractor, the combination of a hydraulic actuator, valve mechanism for controlling the supply and exhaust of pressure fluid to and from said actuator, a position control cam revoluble in unison with raising and lowering of the hitch by said power unit, a draft responsive device including a plunger slidable axially in proportion to changes in draft load on an implement attached to said hitch, a pair of generally upright operating levers arranged with their upper portions spaced apart and suspended by a pivotal support for the upper end portion of one of them, means pivotally connecting the lower ends of both of said levers to said valve mechanism, means for moving individual ones of said levers in response respectively to shift of said plunger and turning of said cam, a manually shiftable fulcrum movable selectively into operative relation with alternate ones of said levers for fulcruming of the same about it as the lever rocks and with consequent actuation of said valve mechanism while leaving the other lever free for unimpeded idle bodily swing by its associated control device, and a hand lever for adjusting the location of said fulcrum with reference to either of the operating levers with which it is operatively associated.

17. In a power operating system for a tractor-borne draft linkage, the combination of a hydraulic actuator adapted to be mechanically connected to the linkage for raising and lowering the same, a normal draft load responsive control mechanism for said actuator and a position responsive control mechanism for said actuator, selector means settable for rendering either one of said control mechanisms operative to control said actuator without being overridden by the other control mechanism under normal operating conditions, and safety release means for disabling said actuator in response to application of a predetermined maximum value of draft load to an implement attached to the linkage irrespective of which one of said control mechanisms is in use at the moment.

18. In a power operating system for an implement connection movably mounted on a tractor, the combination of a hydraulic actuator, valve mechanism for controlling the supply of pressure fluid to said actuator, a position responsive control member movable in proportion to change in position of the implement connection, a draft responsive control member movable in proportion to changes in draft load on an implement attached to said implement connection, a pair of operating levers both pivotally connected to said valve mechanism, means for moving respective ones of said levers in response to shift of corresponding ones of said control members, a manually shiftable fulcrum movable selectively into operative relation with alternate ones of said levers while leaving the other free for unimpeded bodily swing by its associated control member, and a second fulcrum fixedly positioned to intercept the lever connected to said draft responsive control member when such lever is moved a predetermined distance by such draft responsive control member in a maximum loading direction, to thereby limit to a safe value the load to which the system may be subjected in operating either on automatic draft control or position control.

19. The combination of a tractor having an implement hitch trailingly pivoted on its rear end portion for vertical swinging movement, a transverse rockshaft on the tractor connected to said hitch for raising and lowering of the latter as the shaft turns, a hydraulic power unit connected to said rockshaft for turning the same and having a valve mechanism shiftable in opposite directions from an "off" position to raising and lowering positions, a generally vertically disposed floating lever pivotally connected at its lower end to said valve mechanism and suspended at its upper end from a cam follower roller, means guiding said roller for bodily displacement along a path generally paralleling the direction of shift of said valve mechanism, an edge cam on said rockshaft turnable therewith and presented to said roller, a fulcrum adjacent said floating lever, a hand lever for shifting said fulcrum to rock said lever about the point of contact of said roller with said cam to thereby shift said valve mechanism from its "off" position, and said cam being contoured to rock said lever in an opposite direction about said fulcrum during the ensuing turning of said rockshaft to return said valve mechanism to its "off" position.

20. For use in an automatic draft control for ground-working implements of the type in which an axially slidable control plunger is subject to stress in one direction by the overhanging weight of the implement when the latter is elevated and which stress gradually diminishes and finally changes to a progressively increasing stress in the opposite direction as the implement is lowered and ground reaction on the same progressively increased; means operatively connected with said plunger so as to yieldably resist displacement of the same from a neutral position by application thereto of stresses in either direction, said means comprising, in combination, a helical control spring, means operative to connect one end portion of said spring with a fixed anchorage, and means operative to rigidly connect the other end portion of said spring with the control plunger for movement of that end of the spring in unison with the plunger to stress the spring alternatively in either tension or compression in accordance with the direction of application of stress to the plunger.

21. For use in an automatic draft control for ground-working implements of the type in which an axially slidable control plunger is subjected to stress in one direction by the overhanging weight of the implement when the latter is elevated and which stress gradually diminishes and finally changes to a progressively increasing stress in the opposite direction as the implement is lowered and ground reaction on the same progressively increased; means operatively connected with said plunger so as to yieldably resist displacement of the same from a neutral position by application thereto of stresses in either direction, said means comprising, in combination, a helical control spring, means operative to connect one end portion of said spring with a fixed anchorage, and means operative to rigidly connect the other end portion of said spring with the control plunger for movement of that end of the spring in unison with the plunger to stress the spring alternatively in either tension or compression in accordance with the direction of application of stress to the plunger, said last-mentioned connecting means including means for adjusting the position of the plunger with respect to its point of connection to said other end of the spring in a direction along the path of travel of said plunger.

22. For use in a tractor's automatic draft control system for ground-working implements, the combination of an axially displaceable control plunger, a helical control spring adapted to be connected at one end to a fixed anchorage point on the tractor, means for applying alternatively both forwardly directed and rearwardly directed stresses to said plunger in accordance with changes in the net value of horizontal ground reaction on the implement as against the downwardly acting forces of weight and suck to which the implement is subjected in use, and means connecting said other end of the spring to said plunger to enable the spring to resist displacement of the plunger in either direction from a neutral position by the stress applied to the plunger.

23. The combination of a tractor having an implement hitch trailingly mounted thereon and a power unit for raising and lowering such hitch, means for controlling the operation of said unit, alternatively available controls operatively associated with said means for actuating the same to effect, in one case, automatic retention of a uniform draft load on said hitch, and in the other case, positional raising and lowering of said hitch, a hand lever pivoted on the tractor, and a selector operatively connected to said hand lever to be rocked thereby, the connection between said selector and said hand lever being adjustable to selectively change their relative positions and thereby adapt the hand lever for co-operation in one position with the controls for determining the value of the draft load imposed on said hitch, and in another position with the controls for determining the position of said hitch.

24. The combination of a tractor having an implement hitch trailingly mounted thereon and a power unit for raising and lowering such hitch, means for controlling the operation of said power unit, alternatively available controls operatively associated with said means to effect, in the one case, automatic retention of a uniform draft load on said hitch, and in the other case, raising or lowering of said hitch, a shaft journaled on the tractor having an eccentric at one end for co-operation with said controls, a hand lever, and means operatively connecting said hand lever with said shaft, said connecting means being shiftable to change the angular position of said eccentric with respect to said hand lever to condition it for co-operation with either of the controls to the exclusion of the other, said hand lever in one case determining the value of the draft load imposed on the hitch and in the other case the position of the hitch.

References Cited in the file of this patent

UNITED STATES PATENTS

| | | |
|---|---|---|
| 2,356,231 | Ferguson | Aug. 22, 1944 |
| 2,631,514 | Roeder | Mar. 17, 1953 |
| 2,631,515 | McRae | Mar. 17, 1953 |